March 13, 1934.  E. M. PATTERSON  1,950,745

CLOTHESLINE REEL

Filed June 6, 1933

INVENTOR
EDWIN M. PATTERSON.
BY James C. Bradley
ATTORNEY

UNITED STATES PATENT OFFICE 1,950,745

CLOTHESLINE REEL

Edwin M. Patterson, Ingram, Pa.

Application June 6, 1933, Serial No. 674,532

2 Claims. (Cl. 242—100)

Figure 1:
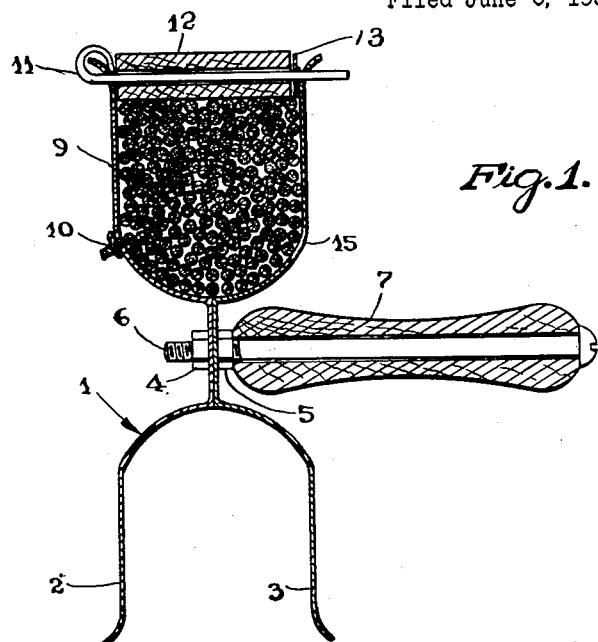
Figure 2:
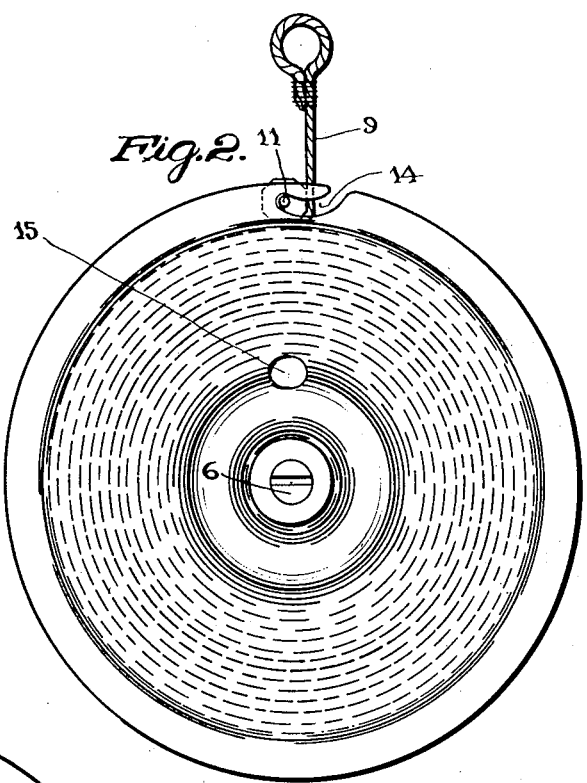
Figure 3:
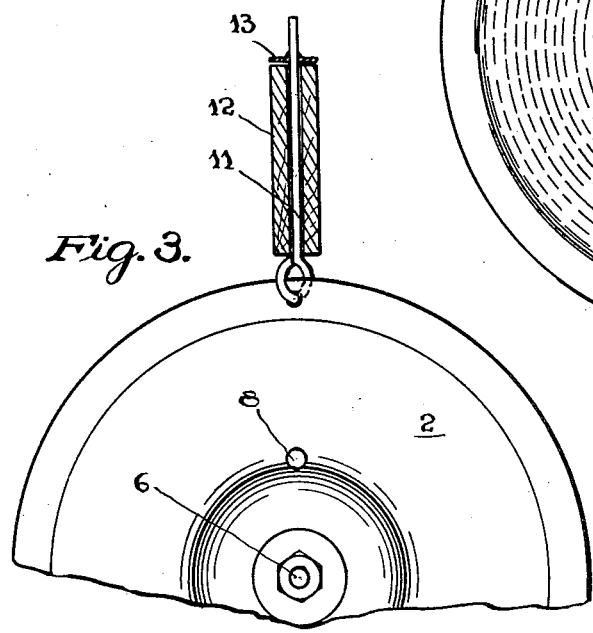

The invention relates to a clothes line reel of the portable type. It has for its principal objects the provision of a reel having improved retaining means for holding the line from unwinding, and one wherein the retaining means may be used as a handle in winding the line onto the reel and for facilitating the removal of any twist which develops in the line during the winding or reeling operation. One embodiment of the invention is shown in the accompanying drawing, wherein:

Figure 1 is a section through the reel with the line shown on one side only thereof. Fig. 2 is an elevation of one side of the reel. And Fig. 3 is a partial elevation of the other side of the reel with the retainer in unlatched or open position.

Referring to the drawing, 1 is the body portion of the reel, preferably made of the annular sheet metal plates 2 and 3 clamped together by the nuts 4 and 5 on the rod 6. This rod has a wood grip 7 swivelled thereon, which is grasped by one hand of the operator in the reeling operation. This provides a light, cheap construction, and is the preferred one, but it will be understood that the body portion of the reel and its supporting handle may be constructed in various forms and that the invention is not limited to the particular body portion and handle shown and described. The plate 2 is provided with a perforation 8, and the line 9 is secured at this point by passing it through this perforation and knotting it, as indicated at 10.

Pivoted to the periphery of the plate 2 is a combination retainer and handle comprising the rod 11 with the grip 12 swivelled thereon, the grip being held in position by the washer 13 which is tightly clamped to the rod. The periphery of the plate 3 is provided with an undercut slot 14, as indicated in Fig. 2, adapted to receive and hold the free end of the retainer when the retainer is positioned, as indicated in Figs. 1 and 2. When the reel is filled with the line or rope, the retainer serves to hold the line from unwinding. A thumb hold 15 is provided in the plate 3 near its center, and adds to the convenience of the device when the user is locking the retainer in position, as this prevents the reel from rotating on the grip 7 at this time.

In using the device, the operator uses the retainer as a winding handle, the grip 7 being grasped in his other hand. In so using the retainer, it is swung to a position 180 degrees from the position of Fig. 1, and due to the fact that both handles are swiveled, the winding on of the line is easily accomplished. If, during the winding on of the line, it becomes twisted, the twist is easily removed by supporting the reel by the retainer in the position of Fig. 3 and turning the reel around the retainer rod 11 as an axis. When the line is completely wound onto the reel, the retainer is moved to holding position and locked in the undercut slot 14, as indicated in Figs. 1 and 2.

It will be understood that the term "annular plates", as used in the claims, refers to the parts 2 and 3 spaced to provide the winding recess whether such parts are formed as shown and clamped together at the center of the reel, or whether they are integral at such center, as this is immaterial to the invention.

What I claim is:

1. In combination in a clothes line reel, a body portion comprising a pair of annular plates with a winding recess therebetween for the reception of the line, a swivelled handle located centrally of the body portion and extending at right angles thereto, a retainer pivoted to the periphery of one of said plates, means on the periphery of the opposing plate for releasably engaging the free end of the retainer and a handle swivelled on said retainer.

2. In combination in a clothes line reel, a body portion comprising a pair of annular plates with a winding recess therebetween for the reception of the line, a handle located centrally of the body portion and extending at right angles thereto, a retaining rod pivoted to the periphery of one of the plates, a handle rotatably mounted on the rod, and a retaining disc secured to the rod inward from the end thereof, the periphery of the plate in opposition to the pivotal connection of the retaining rod being provided with an undercut recess for receiving the end of said rod and releasably holding it.

EDWIN M. PATTERSON.